US 9,906,456 B2

United States Patent
Tsai

(10) Patent No.: US 9,906,456 B2
(45) Date of Patent: Feb. 27, 2018

(54) APPARATUSES AND METHODS FOR CELL SELECTION OR RESELECTION WITH APPLICATION-SPECIFIC CONGESTION CONTROL FOR DATA COMMUNICATION (ACDC), AND STORAGE MEDIUM THEREOF

(71) Applicant: Acer Incorporated, New Taipei (TW)

(72) Inventor: Wei-Chieh Tsai, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 108 days.

(21) Appl. No.: 15/002,458

(22) Filed: Jan. 21, 2016

(65) Prior Publication Data
US 2017/0012882 A1    Jan. 12, 2017

Related U.S. Application Data

(60) Provisional application No. 62/190,397, filed on Jul. 9, 2015.

(51) Int. Cl.
*H04L 12/859* (2013.01)
*H04W 48/20* (2009.01)
*H04W 48/16* (2009.01)
*H04W 48/12* (2009.01)

(52) U.S. Cl.
CPC ......... *H04L 47/2475* (2013.01); *H04W 48/16* (2013.01); *H04W 48/20* (2013.01); *H04W 48/12* (2013.01)

(58) Field of Classification Search
CPC .. H04L 47/2475; H04W 48/16; H04W 48/12; H04W 48/20; H04W 48/06; H04W 48/02; H04W 48/18; H04W 48/10
See application file for complete search history.

(56) References Cited

U.S. PATENT DOCUMENTS

2016/0212653 A1\* 7/2016 Wang ................. A61B 10/0051

FOREIGN PATENT DOCUMENTS

| WO | WO 2014/160611 A1 | 10/2014 |
|---|---|---|
| WO | 2015031202 A1 | 3/2015 |

OTHER PUBLICATIONS

European Search Report dated Dec. 19, 2016; issued in application No. 16153666.9-1854/3116267.

(Continued)

*Primary Examiner* — Ian N Moore
*Assistant Examiner* — Brian T Le
(74) *Attorney, Agent, or Firm* — McClure, Qualey & Rodack, LLP

(57) ABSTRACT

A mobile communication device including a wireless transceiver and a controller is provided. The wireless transceiver performs wireless transmission and reception to and from a service network comprising a plurality of cells. The controller determines whether an Application-specific Congestion control for Data Communication (ACDC) has not been enabled in one of the cells according to system information broadcasted by the cells, and in response to the ACDC not having been enabled in one of the cells, select or reselect to the cell via the wireless transceiver even when the cell has a lower priority level than another cell in which the ACDC has been enabled.

12 Claims, 5 Drawing Sheets

(56) References Cited

OTHER PUBLICATIONS

"3rd Generation Partnership Project; Technical Specification Group Services and System Aspects; Service Accessibility; Release 8" Mar. 2009; pp. 1-25.
"3rd Generation Partnership Project; Technical Specification Group Radio Access Network; Evolved Universal Terrestrial Radio Access (E-UTRA); User Equipment (UE) procedures in idle mode (Release 12);" Mar. 2015; pp. 1-38.
Gogic, A.; "Scope of ASAC feasibility Study;" 3GPP TSG-SA WG1 #63; Aug. 2013; pp. 1-3.
"Remaining issues in ACDC;" 3GPP TSG-RAN2 Meeting #9bis; Oct. 2015; pp. 1-2.
Chinese language office action dated Mar. 23, 2017, issued in application No. TW 105110473.
TW Office Action dated Aug. 11, 2017 in Taiwan application (No. 105110473).
3rd Generation Partnership Project; Technical Specification Group Services and System Aspects; Service accessibility, 3GPP Standard . . . (Mar. 1, 2009).

\* cited by examiner

APPARATUSES AND METHODS FOR CELL SELECTION OR RESELECTION WITH APPLICATION-SPECIFIC CONGESTION CONTROL FOR DATA COMMUNICATION (ACDC), AND STORAGE MEDIUM THEREOF

CROSS REFERENCE TO RELATED APPLICATIONS

This Application claims priority of U.S. Provisional Application No. 62/190,397, filed on Jul. 9, 2015, the entirety of which is incorporated by reference herein.

BACKGROUND OF THE APPLICATION

Field of the Application

The application generally relates to cell selection/reselection, and more particularly to cell selection/reselection with Application-specific Congestion control for Data Communication (ACDC).

Description of the Related Art

With growing demand for ubiquitous computing and networking, various wireless technologies have been developed, including Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, and Time-Division LTE (TD-LTE) technology, etc.

Using LTE technology as an example, the Application-specific Congestion control for Data Communication (ACDC) was first introduced in Release 13 of the 3rd Generation Partnership Project (3GPP) specifications. ACDC aims to provide a more flexible access control mechanism which applies based on the purpose of UE's access attempt. Basically, ACDC groups applications in categories of importance, and applies access controls to lesser categories first, sparing more important applications from denial or deferral of access until and unless the level of congestion is severe enough that they must also be affected.

However, according to release 12 of the 3GPP TS 36.304, a UE in the idle mode only takes the measured signal qualities and the priority levels of the candidate cells into account during the cell selection/reselection procedure. As a result, despite the fact that there are cells which have lower priority levels but the ACDC has not been enabled therein, the UE will choose to camp on the cell which has a higher priority level but the ACDC has been enabled therein, causing a negative user experience with only limited services available.

BRIEF SUMMARY OF THE APPLICATION

In a first aspect of the application, a mobile communication device is provided. The mobile communication device comprises a wireless transceiver and a controller. The wireless transceiver is configured to perform wireless transmission and reception to and from a service network comprising a plurality of cells. The controller is configured to determine whether an Application-specific Congestion control for Data Communication (ACDC) has not been enabled in one of the cells according to system information broadcasted by the cells, and in response to the ACDC not having been enabled in one of the cells, select or reselect to the cell via the wireless transceiver even when the cell has a lower priority level than another cell in which the ACDC has been enabled.

In a second aspect of the application, a method for cell selection or reselection, executed by a mobile communication device wirelessly communicating with a service network comprising a plurality of cells, is provided. The method comprises the steps of: determining whether an ACDC has not been enabled in one of the cells according to system information broadcasted by the cells; and in response to the ACDC not having been enabled in one of the cells, selecting or reselecting to the cell even when the cell has a lower priority level than another cell in which the ACDC has been enabled.

In a third aspect of the application, a non-transitory machine-readable storage medium comprising a computer program, which, when executed, causes a mobile communication device to perform a method for cell selection or reselection, is provided. The method comprises the steps of: determining whether an ACDC has not been enabled in one of the cells according to system information broadcasted by the cells; and in response to the ACDC not having been enabled in one of the cells, selecting or reselecting to the cell even when the cell has a lower priority level than another cell in which the ACDC has been enabled.

Other aspects and features of the invention will become apparent to those with ordinary skill in the art upon review of the following descriptions of specific embodiments of the mobile communication devices and methods for cell selection or reselection.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The 3GPP specifications are used to teach the spirit of the application, and the application is not limited thereto.

Figure 1:
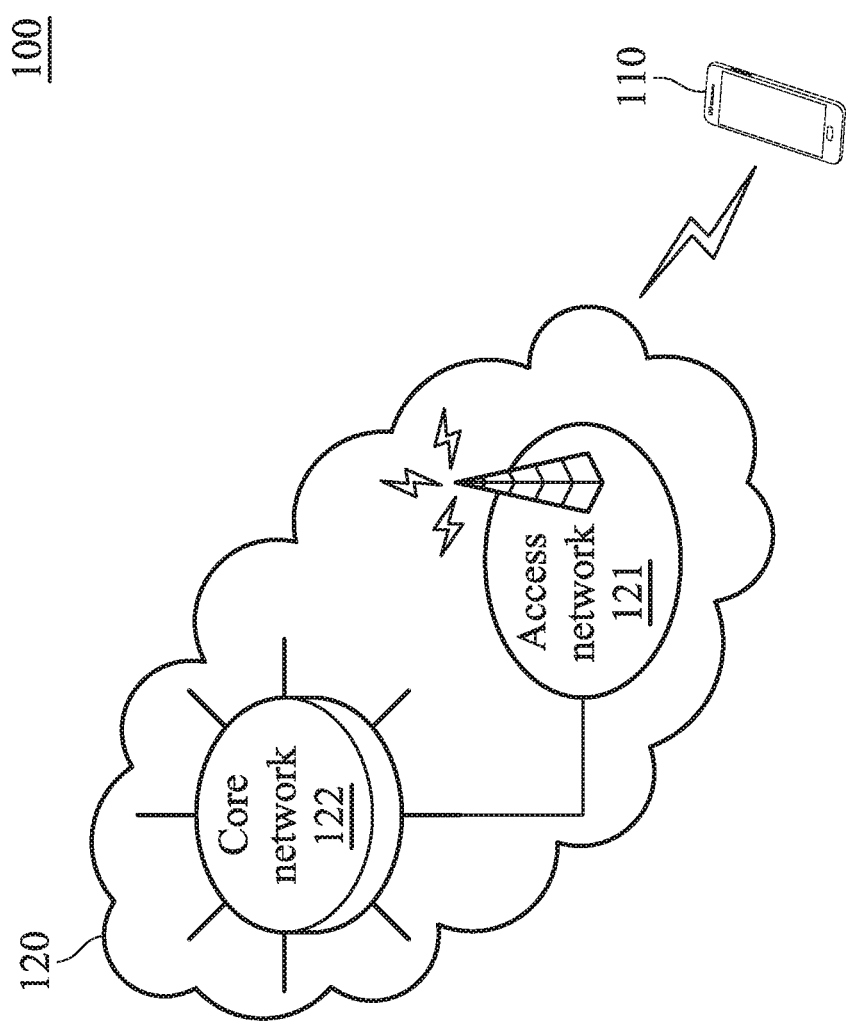
FIG. 1 is a block diagram of a wireless communication environment according to an embodiment of the application.

FIG. 1 is a block diagram of a wireless communication environment according to an embodiment of the application. The wireless communication environment 100 comprises a mobile communication device 110 and a service network 120, wherein the mobile communication device 110 is wirelessly connected to the service network 120 for obtaining mobile services. The mobile communication device 110 may be a feature phone, a smartphone, a panel Personal Computer (PC), a laptop computer, or any computing device supporting the wireless technology utilized by the service network 120. The service network 120 may be a cellular network, such as an LTE/LTE-A/TD-LTE network.

Specifically, the service network 120 comprises an access network 121 and a core network 122, wherein the access network 121 is responsible for processing radio signals, terminating radio protocols, and connecting the mobile communication device 110 with the core network 122, while the core network 122 is responsible for performing mobility management, network-side authentication, and interfaces with public/external networks (e.g., the Internet). Each of the access network 121 and the core network 122 may comprise one or more network nodes for carrying out said functions. For example, if the service network 120 is an LTE/LTE-A/TD-LTE network, the access network 121 may be an Evolved-UTRAN (E-UTRAN) which includes at least an evolved NB (eNB) (e.g., a macro eNB, femto eNB, or pico eNB), and the core network 122 may be an Evolved Packet Core (EPC) which includes a Home Subscriber Server (HSS), Mobility Management Entity (MME), Serving Gateway (S-GW), and Packet Data Network Gateway (PDN-GW or P-GW).

Figure 2:
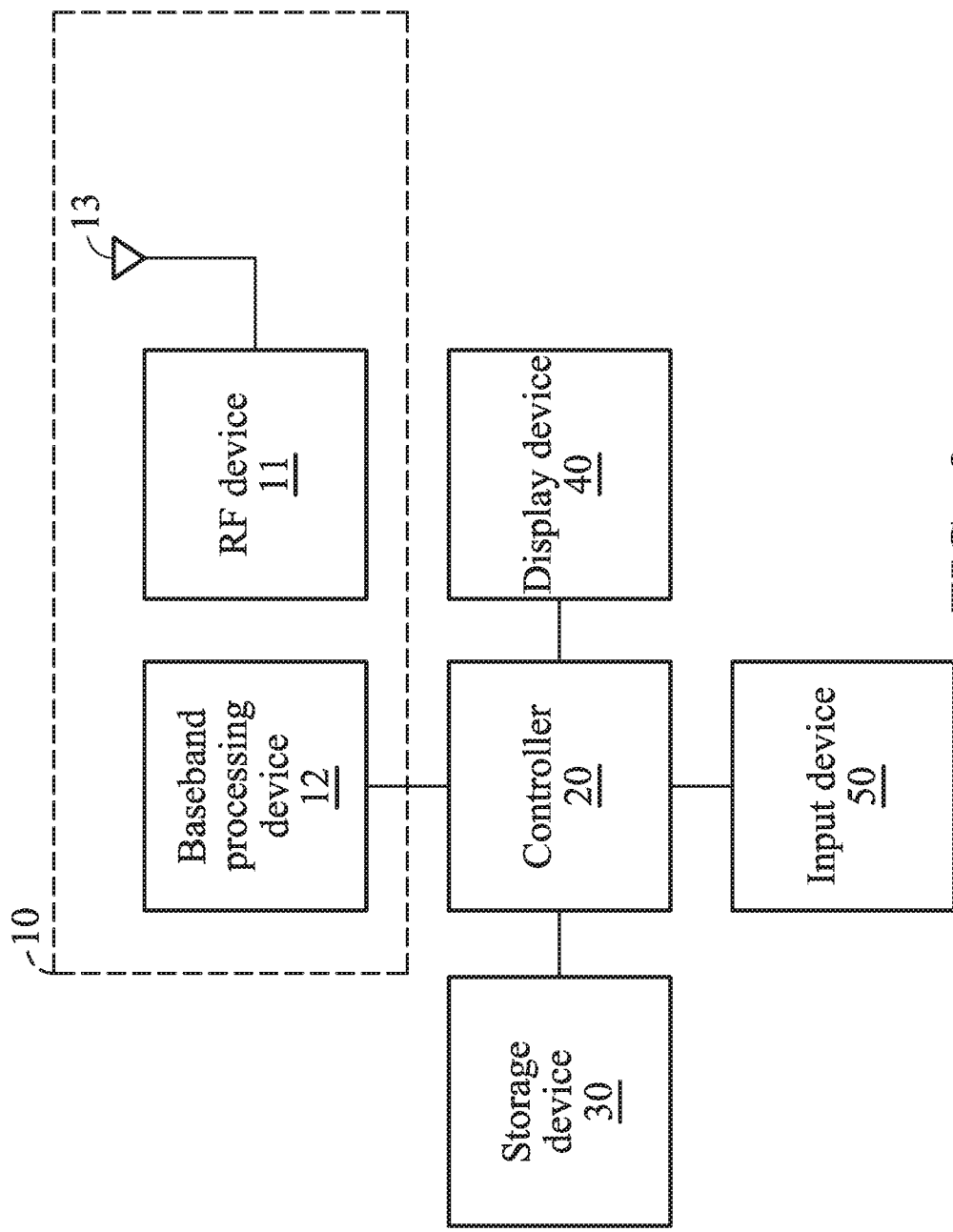
FIG. 2 is a block diagram illustrating the mobile communication device 110 according to an embodiment of the application.

FIG. 2 is a block diagram illustrating the mobile communication device 110 according to an embodiment of the application. The mobile communication device 110 comprises a wireless transceiver 10, a controller 20, a storage device 30, a display device 40, and an input device 50. The wireless transceiver 10 is configured to perform wireless transmission and reception to and from the service network 140 and other nearby mobile communication devices. The wireless transceiver 10 comprises a Radio Frequency (RF) device 11, a baseband processing device 12, and an antenna 13. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna 13, convert the received RF wireless signals to baseband signals, which are processed by the baseband processing device 12, or receive baseband signals from the baseband processing device 12 and convert the received baseband signals to RF wireless signals, which are later transmitted via the antenna 13. The RF device 11 may also contain multiple hardware devices to perform radio frequency conversion. For example, the RF device 10 may comprise a mixer to multiply the baseband signals with a carrier oscillated in the radio frequency of the supported wireless technology, wherein the radio frequency may be 900 MHz, 2100 MHz, or 2.6 GHz utilized in LTE/LTE-A/TD-LTE technology, or another radio frequency, such as an unlicensed frequency band (e.g., 2.4 GHz) or a licensed frequency band for another wireless technology.

The controller 20 may be a general-purpose processor, a Micro Control Unit (MCU), an application processor, a Digital Signal Processor (DSP), or the like, for controlling the wireless transceiver 10 for wireless communications with the service network 140 and other nearby mobile communication devices, storing and retrieving data to and from the storage device 30, sending a series of frame data (e.g. representing text messages, graphics, images, etc.) to the display device 40, receiving signals from the input device 50. In particular, the controller 20 coordinates the aforementioned operations of the wireless transceiver 10, the storage device 30, the display device 40, and the input device 50 for performing the method for ProSe UE-to-network relay.

In another embodiment, the controller 20 may be incorporated into the baseband processing device 12, serving as a baseband processor.

The storage device 30 is a non-transitory machine-readable storage medium, including a memory, such as a FLASH memory or a Non-volatile Random Access Memory (NVRAM), or a magnetic storage device, such as a hard disk or a magnetic tape, or an optical disc, or any combination thereof for storing received cell information list, ACDC cell information, and/or instructions and/or program code of applications, communication protocols, and/or the method of the present application.

The display device 40 may be a Liquid-Crystal Display (LCD), Light-Emitting Diode (LED) display, or Electronic Paper Display (EPD), etc., for providing a display function. Alternatively, the display device 40 may further comprise one or more touch sensors disposed thereon or thereunder for sensing touches, contacts, or approximations of objects, such as fingers or styluses.

The input device 50 may comprise one or more buttons, a keyboard, a mouse, a touch pad, a video camera, a microphone, and/or a speaker, etc., serving as the Man-Machine Interface (MMI) for interaction with users.

It should be understood that the components described in the embodiment of FIG. 2 are for illustrative purposes only and are not intended to limit the scope of the application.

Figure 3:
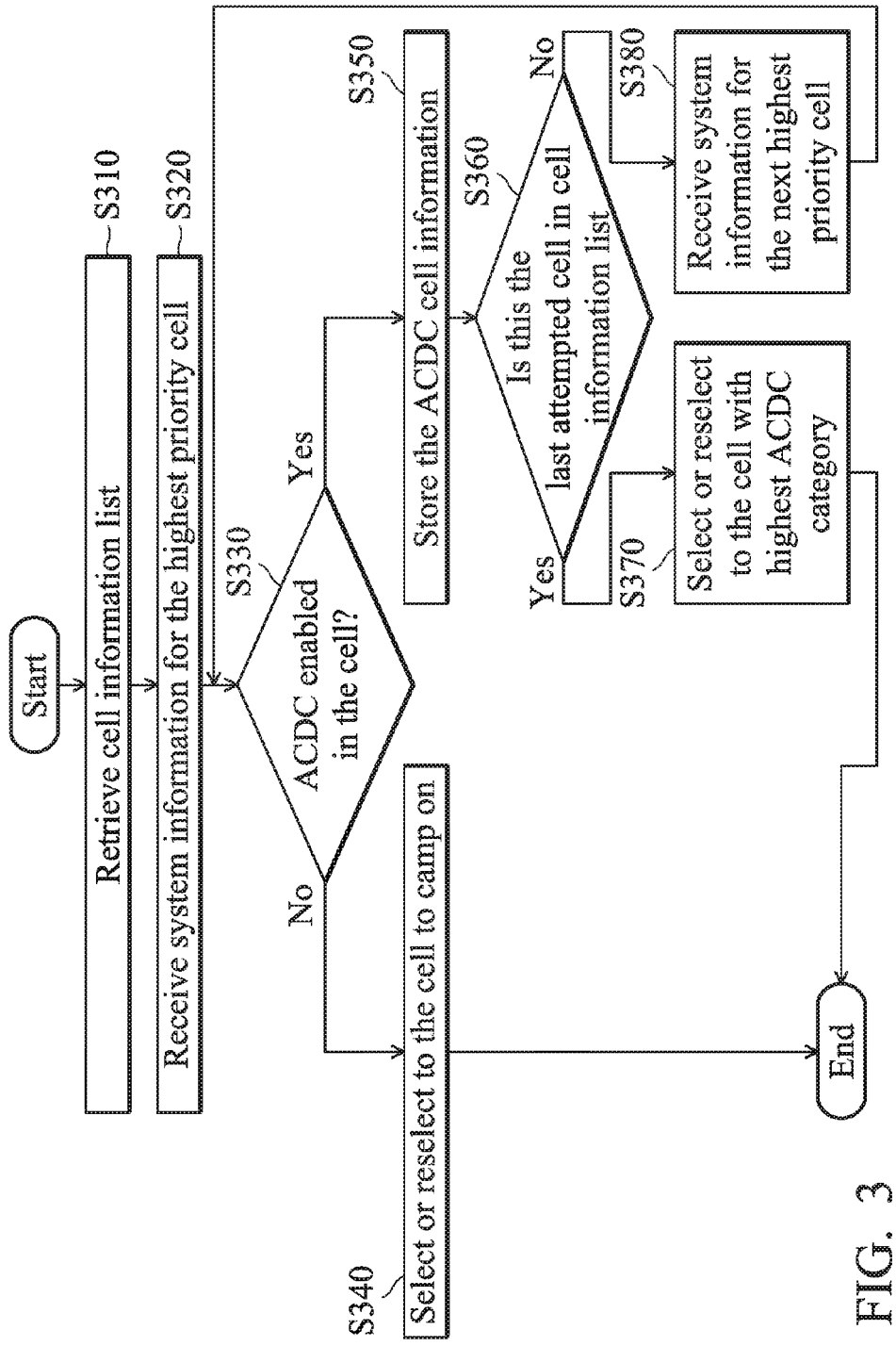
FIG. 3 is a flow chart illustrating the method for cell selection or reselection according to an embodiment of the application.

FIG. 3 is a flow chart illustrating the method for cell selection or reselection according to an embodiment of the application. In this embodiment, the method is applied to a mobile communication device, such as the mobile communication device 110. To begin, when the cell selection or reselection procedure is initiated, the mobile communication device retrieves the cell information list (step S310). The cell information list contains information, including priority levels and cell selection/reselection criteria, of intra-frequency cells, inter-frequency cells, and/or inter-Radio Access Technology (RAT) cells. The cell information list may be previously received in a system information broadcast (e.g., System Information Block (SIB) type 3, 4, 5, 6, 7, or 8) or a dedicated message (e.g., RRC CONNECTION RELEASE message) from the currently registered service network. In one embodiment, if the system information broadcast and dedicated message provide different cell information list, the mobile communication device may ignore the cell information list provided by the system information broadcast.

Next, the mobile communication device receives the system information broadcasted by the cell which has the highest priority level in all cells of the cell information list (step S320), and determines whether the ACDC has been enabled in the cell according to the system information of the cell (step S330).

If the ACDC has not been enabled in the cell, the mobile communication device selects or reselects to the cell to camp on (step S340), and the method ends. Otherwise, if the ACDC has been enabled in the cell, the mobile communication device stores the ACDC cell information (step S350), and determines whether the cell is the last cell attempted by the method in all cells of the cell information list (step S360). Specifically, the ACDC cell information is received from the system information broadcasted by the cell, which contains the ACDC category and information concerning whether the ACDC has been enabled or not.

Subsequent to step S360, if the cell is the last cell attempted by the method, the mobile communication device selects or reselects to the cell which has the highest ACDC category in all cells of the cell information list (step S370), and the method ends. Advantageously, by camping on the cell with the highest ACDC category, the mobile communication device is allowed to obtain less limited services. Exemplary ACDC categories are given below in Table 1 for reference.

TABLE 1

| Allowed ACDC Applications | ACDC Category 1 | ACDC Category 2 | ACDC Category 3 |
| --- | --- | --- | --- |
| Emergency Services | Yes | Yes | Yes |
| Instant Messaging Services | No | Yes | Yes |
| Video Services | No | No | Yes |

Subsequent to step S360, if the cell is not the last cell attempted by the method, the mobile communication device receives the system information broadcasted by the cell which has the next highest priority level in all cells of the cell information list (step S380), and the method flow goes to step S330.

Figure 4:
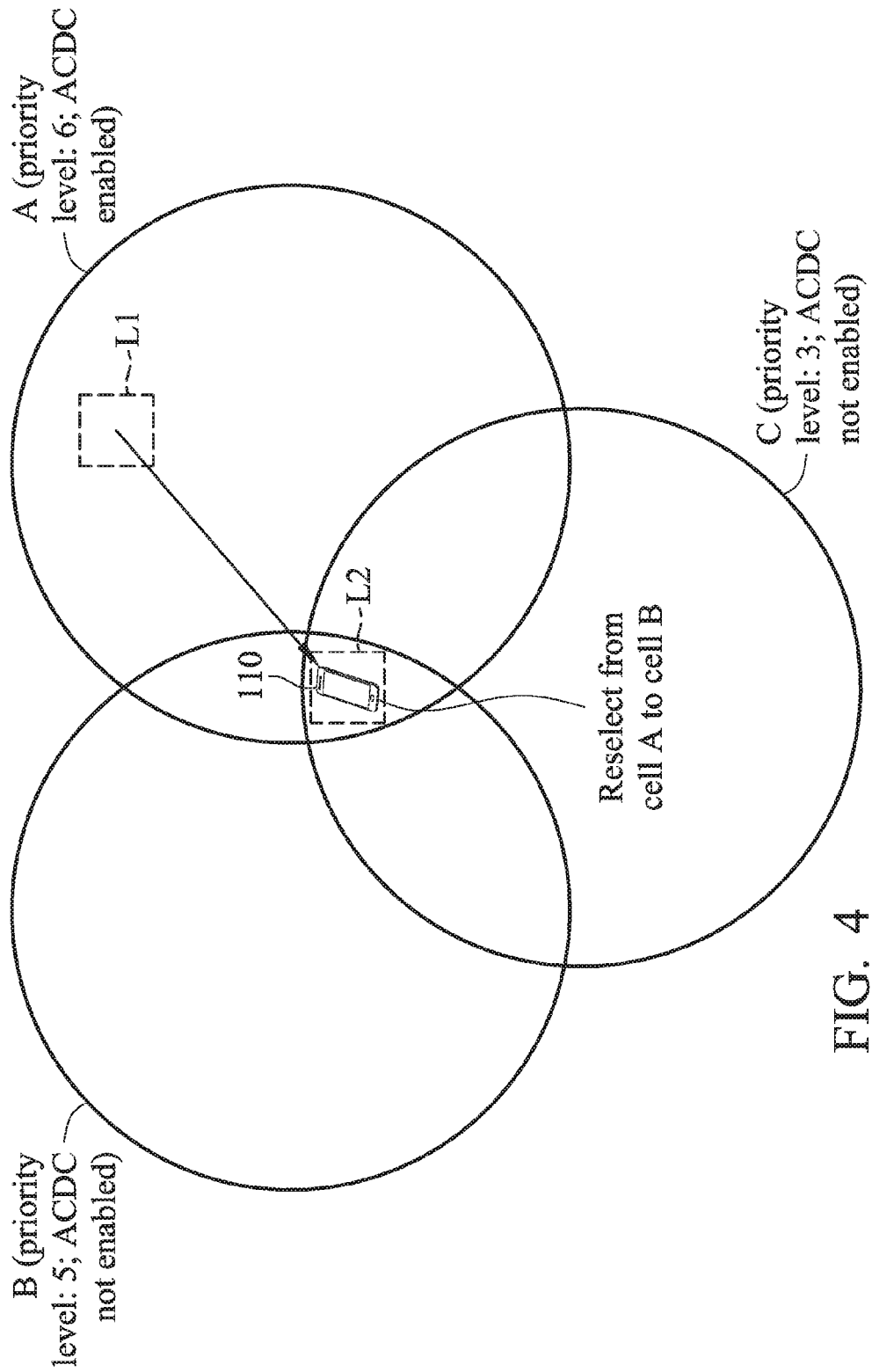
FIG. 4 is a block diagram illustrating an exemplary cell selection/reselection procedure according to an embodiment of FIG. 3.

FIG. 4 is a block diagram illustrating an exemplary cell selection/reselection procedure according to an embodiment of FIG. 3. As shown in FIG. 4, there are three cells A, B, and C in the area where the mobile communication device 110 is located. The access network 121 may include one or more eNBs serving the three cells, depending on the number of component carriers supported by each eNB. An eNB may be a station that communicates with a User Equipment (UE), e.g., the mobile communication device 110, and may also be referred to as a base station, a cellular station, an access point, or the like. Each eNB may provide communication coverage for a particular geographic area. In 3GPP, the term "cell" can refer to this particular geographic coverage area of an eNB and/or an eNB subsystem serving the coverage area, depending on the context in which the term is used.

In one embodiment, the access network 121 may be a heterogeneous network that includes eNBs of different types, e.g., macro eNBs, pico eNBs, femto eNBs, relays, etc. A macro cell generally covers a relatively large geographic area (e.g., several kilometers in radius) and may allow unrestricted access by UEs with service subscriptions with the network provider. A pico cell generally covers a relatively smaller geographic area and may allow unrestricted access by UEs with service subscriptions with the network provider. A femtocell generally covers a relatively small geographic area in a residential-type setting (e.g., a home or small business) and, in addition to unrestricted access, may also provide restricted access by UEs having an association with the femtocell (e.g., UEs in a Closed Subscriber Group (CSG), UEs for users in the home, and the like).

The mobile communication device 110, when configured to operate in the idle mode, may perform the cell selection or reselection procedure to camp on one of the cells. For example, upon power on, the mobile communication device 110 may perform the cell selection procedure to camp on a cell; and as the mobile communication device 110 moves, it may perform the cell reselection procedure to reselect to another cell that best serves the mobile communication device 110 in its new location.

Referring back to FIG. 4, the mobile communication device 110 was initially camped on cell A when it is at the location L1 which is solely under the radio coverage of cell A. After that, the mobile communication device 110 moves from location L1 to L2 where the radio coverage of cells A, B, and C overlap. Specifically, the priority levels of cells A, B, and C are 6, 5, and 3, respectively, and the ACDC has been enabled in cell A, but not in cells B and C.

Please note that, unlike the conventional design in which the UE will stay in cell A (i.e., the highest priority cell among all cells regardless of whether the ACDC has been enabled or not), the mobile communication device 110 may reselect from cell A to cell B since cell B has the highest priority level among the cells in which the ACDC has not been enabled. That is, the cell in which the ACDC has been enabled may be excluded during the cell selection or reselection procedure.

Figure 5:
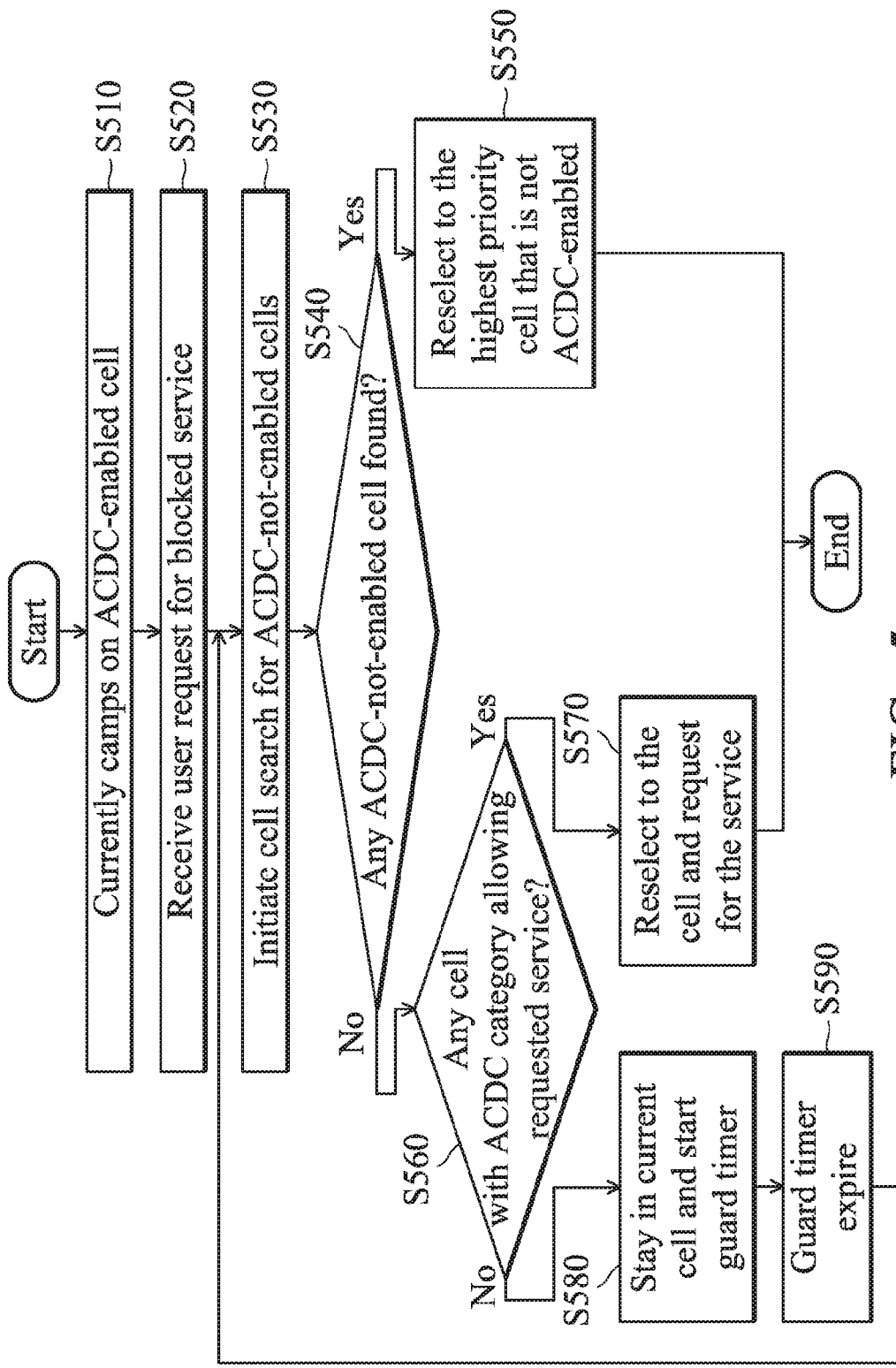
FIG. 5 is a flow chart illustrating the method for cell selection or reselection according to another embodiment of the application.

FIG. 5 is a flow chart illustrating the method for cell selection or reselection according to another embodiment of the application. In this embodiment, the method is applied to a mobile communication device, such as the mobile communication device 110. To begin, the mobile communication device currently camps on a cell in which the ACDC has been enabled (step S510). Next, the mobile communication device receives a user's request for a service which is blocked in the current cell (step S520).

In response to the request, the mobile communication device initiates a cell search procedure to search for cells in which the ACDC has not been enabled (step S530). Specifically, the cell search procedure is performed according to the cell information list previously received in a system information broadcast (e.g., SIB type 3, 4, 5, 6, 7, or 8) or a dedicated message (e.g., RRC CONNECTION RELEASE message) from the current cell, and during the cell search procedure, the mobile communication device attempts to receive the system information broadcasted by the cells in the cell information list. Subsequently, it is determined whether any cell in which the ACDC has not been enabled has been found (step S540).

If one or more cells in which the ACDC has not been enabled are found, the mobile communication device reselects to the cell which has the highest priority level among all the cells in which the ACDC has not been enabled (step S550), and the method ends.

Otherwise, if no cell in which the ACDC has not been enabled is found, it is determined whether there is a cell with ACDC category allowing the requested service (step S560). If such a cell exists, the mobile communication device reselects to the cell and requests the cell for the service (step S570), and the method ends. Otherwise, if such a cell doesn't exist, the mobile communication device stays in the current cell and starts a guard timer to count a predetermined period of time (step S580). After that, when the guard timer expires (step S590), the method flow goes to step S530 to re-initiate the cell search procedure.

It should be noted that, regarding other detailed description of the cell selection or reselection procedure, reference may be made to the 3GPP TS 36.304. Also, regarding other detailed description of the ACDC mechanism, reference may be made to the 3GPP TR 22.806.

While the application has been described by way of example and in terms of preferred embodiment, it should be understood that the application is not limited thereto. Those who are skilled in this technology can still make various alterations and modifications without departing from the scope and spirit of this application. Therefore, the scope of the application shall be defined and protected by the following claims and their equivalents.

What is claimed is:

1. A mobile communication device, comprising:
a wireless transceiver, configured to perform wireless transmission and reception to and from a service network comprising a plurality of cells; and
a controller, configured to determine whether an Application-specific Congestion control for Data Communication (ACDC) for a Long Term Evolution (LTE)-based technology has not been enabled in a first cell among the cells according to system information broadcasted by the cells, and in response to the ACDC for the LTE-based technology not having been enabled in the first cell, select or reselect to the first cell via the wireless transceiver even when the first cell has a lower priority level than a second cell among the cells, in which the ACDC for the LTE-based technology has been enabled;
wherein the controller module is further configured to select or reselect to a third cell among the cells, which has a highest ACDC service category among allowed ACDC services than the cells other than the third cell, in response to the ACDC for the LTE-based technology having been enabled in all of the cells.

2. The mobile communication device of claim 1, wherein, in response to the ACDC for the LTE-based technology not having been enabled in the first cell, the ACDC for the LTE-based technology has not been enabled in more than one of the cells, and the priority level of the first cell is the highest among all priority levels of the cells in which the ACDC for the LTE-based technology has not been enabled.

3. The mobile communication device of claim 1, wherein, prior to the cell selection or reselection, the controller is further configured to camp on the second cell, and initiate a search for the first cell via the wireless transceiver in response to a request for a service which is blocked in the second cell, and the service is allowed after the cell selection or reselection.

4. The mobile communication device of claim 3, wherein, in response to the cell search having failed, the controller is further configured to re-initiate the cell search after waiting a predetermined period of time.

5. A method for cell selection or reselection, executed by a mobile communication device wirelessly communicating with a service network comprising a plurality of cells, the method comprising:
determining whether an Application-specific Congestion control for Data Communication (ACDC) for a Long Term Evolution (LTE)-based technology has not been enabled in a first cell among the cells according to system information broadcasted by the cells;
in response to the ACDC for the LTE-based technology not having been enabled in the first cell, selecting or reselecting to the first cell even when the first cell has a lower priority level than a second cell among the cells, in which the ACDC for the LTE-based technology has been enabled; and
in response to the ACDC for the LTE-based technology having been enabled in all of the cells, selecting or reselecting to a third cell among the cells, which has a highest ACDC service category among allowed ACDC services than the cells other than the third cell.

6. The method of claim 5, wherein, in response to the ACDC for the LTE-based technology not having been enabled in the first cell, the ACDC for the LTE-based technology has not been enabled in more than one of the cells, and the priority level of the first cell is the highest among all priority levels of the cells in which the ACDC for the LTE-based technology has not been enabled.

7. The method of claim 5, further comprising:
prior to the cell selection or reselection,
camping on the second cell, and
initiating a search for the first cell in response to a request for a service which is blocked in the second cell,
wherein the service is allowed after the cell selection or reselection.

8. The method of claim 7, further comprising:
in response to the cell search having failed, re-initiating the cell search after waiting a predetermined period of time.

9. A non-transitory machine-readable storage medium comprising a computer program which, when executed by a processor, causes a mobile communication device to perform a method for cell selection or reselection, wherein the method comprises:
determining whether an Application-specific Congestion control for Data Communication (ACDC) for a Long Term Evolution (LTE)-based technology has not been enabled in a first cell among a plurality of cells according to system information broadcasted by the cells;
in response to the ACDC for the LTE-based technology not having been enabled in the first cell, selecting or reselecting to the first cell even when the first cell has a lower priority level than a second cell among the cells, in which the ACDC has been enabled; and
in response to the ACDC for the LTE-based technology having been enabled in all of the cells, selecting or reselecting to a third cell among the cells, which has a highest ACDC service category among allowed ACDC services than the cells other than the third cell.

10. The non-transitory machine-readable storage medium of claim 9, wherein, in response to the ACDC for the LTE-based technology not having been enabled in the first cell, the ACDC for the LTE-based technology has not been enabled in more than one of the cells, and the priority level of the first cell is the highest among all priority levels of the cells in which the ACDC for the LTE-based technology has not been enabled.

11. The non-transitory machine-readable storage medium of claim 9, wherein the method further comprises:
prior to the cell selection or reselection,
camping on the second cell, and
initiating a search for the first cell in response to a request for a service which is blocked in the second cell,
wherein the service is allowed after the cell selection or reselection.

12. The non-transitory machine-readable storage medium of claim 11, wherein the method further comprises:
in response to the cell search having failed, re-initiating the cell search after waiting a predetermined period of time.

* * * * *